US005730034A

United States Patent [19]
Hashimoto et al.

[11] Patent Number: 5,730,034
[45] Date of Patent: Mar. 24, 1998

[54] AUTOMATIC BOLT DRIVING APPARATUS FOR DRIVING BOLTS TO SECURE ELONGATED CONCRETE MOLDING FRAME SEGMENTS

[75] Inventors: Ryoichi Hashimoto; Ichiro Honma, both of Iwaki; Nobuhiko Nishiwaki, Tokyo, all of Japan

[73] Assignee: K.K. Joban Engineering, Iwaki, Japan

[21] Appl. No.: 644,711

[22] Filed: May 10, 1996

[51] Int. Cl.$^6$ .................... B25B 29/00; B25B 13/00
[52] U.S. Cl. ........................... 81/57.4; 81/57.24
[58] Field of Search .................... 81/54, 57.4, 57, 81/57.11, 57.24, 57.36

[56] References Cited

U.S. PATENT DOCUMENTS

| | | | |
|---|---|---|---|
| 3,886,821 | 6/1975 | Tokunaga et al. | 81/54 |
| 5,515,752 | 5/1996 | Sawano et al. | 81/57.4 |

Primary Examiner—D. S. Meislin
Attorney, Agent, or Firm—Kenjiro Hidaka

[57] ABSTRACT

A movable automatic bolt driving apparatus sequentially drives a plurality of bolts positioned substantially in line on flanges of elongated concrete molding frame segments for producing columnar concrete products. The apparatus has a vertically movable bolt driver unit and an air-cylinder unit. When the bolt driver unit drives a bolt in a state that the socket and the bolt are non-concentrically engaged with each other, the air-cylinder unit causes to properly reposition the bolt driver unit. At least a part of the bolt driver unit, which is normally disposed vertically, is pivotable with a horizontal pivotal axis orthogonal to the moving direction of the apparatus. The apparatus also has a flange follower for guiding the bolt driver unit. At least a part of the flange follower, which includes a roller having a vertical rotating axis, is pivotable about a vertical rotational axis. The rotational axis of the roller is offset toward the moving direction of the apparatus with respect to the rotational axis of the pivotable part of the flange follower. The apparatus further has a sensor unit that detects a tilted state of the pivotable part of the bolt driver unit, another sensor that detects a tilted state of the pivotable part of the flange follower, and a video camera for measuring a position of the bolt that is to be driven succeedingly.

6 Claims, 12 Drawing Sheets

AUTOMATIC BOLT DRIVING APPARATUS FOR DRIVING BOLTS TO SECURE ELONGATED CONCRETE MOLDING FRAME SEGMENTS

BACKGROUND OF THE INVENTION

1. Field of the Invention

This invention pertains to a movable automatic bolt driving apparatus for sequentially driving a plurality of bolts positioned substantially in line on flanges of elongated concrete molding frame segments for producing columnar concrete products such as concrete piles, pillars, or electric utility poles.

2. Description of the Prior Art

A typical large elongated molding frame for producing concrete piles or electric utility poles consists of a pair of top and bottom frame segments each having a semi-circular section. Each of the half tubular molding frame segment has a pair of linear flanges longitudinally extending along the sides of the frame segment.

FIG. 1 is a perspective view of a columnar concrete product molding system in which an automatic bolt driving apparatus according to the present invention is installed. Since the parts other than the automatic bolt driving apparatus shown in FIG. 1, including a concrete molding frame, are prior known, the explanation here will first be made in reference to FIG. 1.

The tubular concrete molding frame 80 has a bottom frame segment 80d and a top frame segment 80u, each having a semicircular section, that join each other at joining edges 81. The entire molding frame 80 is horizontally laid on a base (not shown). Each of the frame segments 80d and 80u has a pair of fastening flanges 82d and 82u, respectively, with straight edges 82e, on opposing sides thereof extending longitudinally along the respective joining edges 81. Each of the fastening flanges 82d and 82u has a plurality of bolt holes 83h disposed, longitudinally aligned, at predetermined even intervals. The holes 83h in the flanges 82d and 82u are also vertically aligned with each other.

To produce a columnar concrete product, formed reinforcing iron rods are first placed on the bottom frame segment 80d and fresh concrete is poured onto the bottom frame segment 80dcovering the reinforcing iron rods. Then, the top frame segment 80u is placed thereonto in alignment with the bottom frame segment 80d and the respective pairs of the flanges 82dand 82u are put together and fastened to each other by a plurality of fastening bolts 83. After the concrete is cured, the bolts 83 are loosened, the top frame segment 80u is removed and the molded concrete columnar product is removed from the bottom frame segment 80d.

Fastening or loosening a number of the bolts 83 manually is a time consuming work and that has been a drawback in the production of the concrete piles or poles.

In order to improve the production efficiency, an automatic bolt driving apparatus, as described in Japanese patent 55-4531 published Jan. 30, 1980, was introduced. However, in order to use this automatic bolt driving apparatus, an entire concrete molding frame with concrete therein had to be moved in synchronization with the operation of the bolt driving apparatus. The entire structure of this prior system was, accordingly, bulky and heavy. In addition, the control system for obtaining synchronizing between the operation of the bolt driving apparatus and the movements of the molding frame was complicated and liable to cause problems. Therefore, the system was operated neither efficiently nor economically.

Other prior known columnar concrete molding system has a number of bolt driving units so that all or a plurality of fastening bolts are driven at a time. This system also has a drawback of being too bulky, and positioning a plurality of bolt drivers at exactly right places requires a complex system. The bolts tended to be broken because the bolt drivers were often not properly positioned in alignment with the respective bolts.

In order to solve the above described problems, one of the applicants of the present invention introduced a bolt driving system for a columnar concrete molding frame including a movable automatic bolt driving apparatus that moves along the elongated concrete molding frame, as is described in the laid-open Japanese patent application, application no. 4-322122, laid-open date Jun. 4, 1994. That system sequentially detects the positions of the object bolts, automatically moves a bolt driving unit to, and stops at, the object bolt to be driven succeedingly, and drives the bolt. The apparatus was compact, simple and easy to control. This apparatus had, however, still rooms for improvements in terms of safe, precise and quick movement or positioning of the driving unit in reference to the position of the object bolt. A socket of the bolt driving unit sometimes accidentally collided with a tire, bracing the molding frame, or other object resulting in a damage thereto, or the socket could not be precisely concentrically aligned with the bolt to be driven because all of the bolts were not necessarily be positioned precisely linearly aligned.

SUMMARY OF THE INVENTION

In view of the above mentioned situation, the object of the present invention is to provide an improved automatic bolt driving apparatus for driving bolts that fasten a pair of elongated molding frame segments used for producing columnar concrete products. The improved bolt driving apparatus is particularly intended to easily adjust the position thereof where the driving takes place responsive to any slight variation of the positions of the object bolts. The bolt driving apparatus is further intended to prevent any damage thereto that may occur when a bolt driving unit thereof accidentally collides with any object while the apparatus is being moved along the molding frame.

In order to achieve the object, the automatic bolt driving apparatus according to the present invention is movable along elongated concrete molding frame segments for sequentially driving a plurality of bolts positioned substantially in line on extended flanges of the frame segments to secure the frame segments. The bolt driving apparatus has a base that is adapted for moving along the concrete molding frame segments; a vertical supporting unit fixedly mounted on the base; a horizontal supporting unit supported by the vertical supporting unit in a manner vertically and horizontally movable; a driver unit support mounted on the horizontal supporting unit in a manner horizontally slidable; a bolt driver unit mounted on the driver unit support in a manner vertically movable, the bolt driver unit having a drive shaft and a socket attached to a low end of the drive shaft; an air-cylinder unit having an air-cylinder fixedly mounted on the horizontal supporting unit and an actuating rod that is linked to the driver unit support so that when the bolt driver unit drives a bolt in a state that the socket and the bolt are non-concentrically engaged with each other air pressure inside the air-cylinder varies, thereby causing to actuate the rod to move the driver unit support so as to properly reposition the bolt driver unit; a flange follower mounted on the driver unit support for guiding the bolt driver unit; and a video camera fixedly mounted on the horizontal supporting unit, the video camera being adapted for being focused on at least one of the bolts on the flanges. At least a part of the flange follower, including a roller, is pivotable about a vertical rotational axis in one rotational direction while being urged by a spring in the other rotational direction, so that any impact to that part of the flange follower is mitigated when the part accidentally collides with an object while the automatic bolt driving apparatus is moving with the flange follower. The roller of the flange follower keeps contact with the flanges, and the rotational axis of the roller is offset toward the moving direction of the automatic bolt driving apparatus with respect to the rotational axis of the pivotable part of the flange follower.

At least a part, including the drive shaft and the socket, of the bolt driver unit is normally disposed vertically, but is pivotable in one rotational direction about a horizontal pivotal axis orthogonal to the moving direction of the automatic bolt driving apparatus while being urged by a spring in the other rotational direction, so that any impact to the pivotable part of the bolt driver unit is mitigated when the part accidentally collides with an object while the automatic bolt driving apparatus is in motion. The automatic bolt driving apparatus further has a sensor unit that detects any tilted state of the pivotable part of the bolt driver unit, another sensor that detects a tilted state of the pivotable part of the flange follower, and a video camera for measuring a position of the bolt that is to be driven succeedingly.

DETAILED DESCRIPTION OF THE PREFERRED

Figure 1:
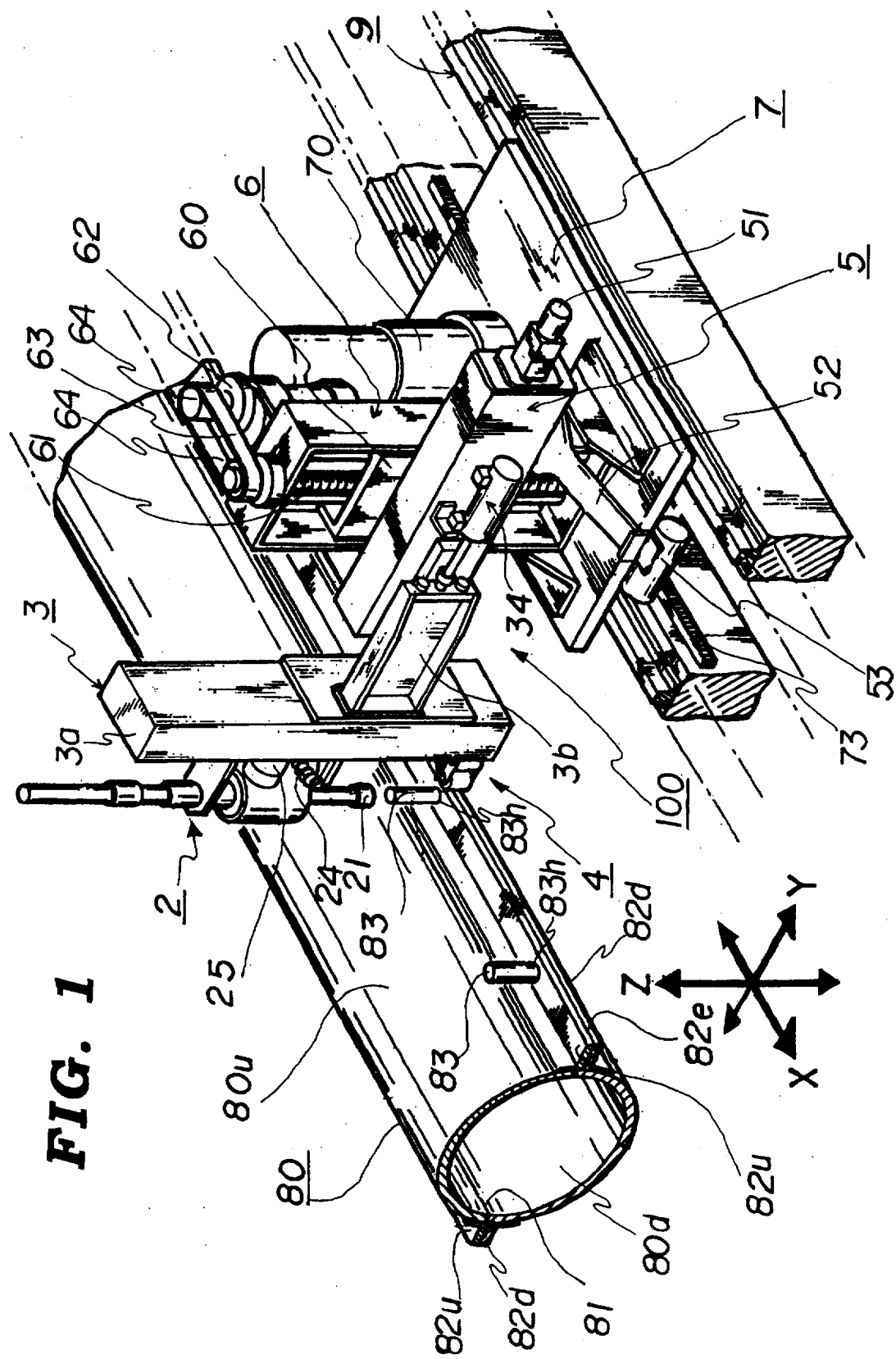
FIG. 1 is a perspective view of a columnar concrete product molding system that includes an automatic bolt driving apparatus according to the present invention.

FIG. 1 is a perspective view of a columnar concrete product molding system that includes an automatic bolt driving apparatus according to the present invention. Since explanation is already made in detail before on the concrete molding frame 80 in reference to FIG. 1, no duplicate explanation will be made here on the molding frame 80.

Now, a preferred embodiment of an automatic bolt driving apparatus of the present invention will be described in detail in reference to the drawings. The automatic bolt driving apparatus of this embodiment is applied to a pair of elongated concrete molding frame segments with which molded columnar concrete products are manufactured.

Referring to FIG. 1, the columnar concrete molding system includes an automatic bolt driving apparatus 100 according to the present invention, a track base 9 therefor, and the concrete molding frame 80. The track base 9 and the concrete molding frame 80 are prior known items and not included in the bolt driving apparatus 100 of the present invention.

Throughout this specification, directions X, Y and Z are defined as a direction parallel with a longitudinal direction of the horizontally disposed elongated molding frame segments 80d, 80u, a horizontal direction orthogonal to direction X, and a vertical direction orthogonal to directions X and y, respectively, as shown in FIG. 1.

Figure 2:
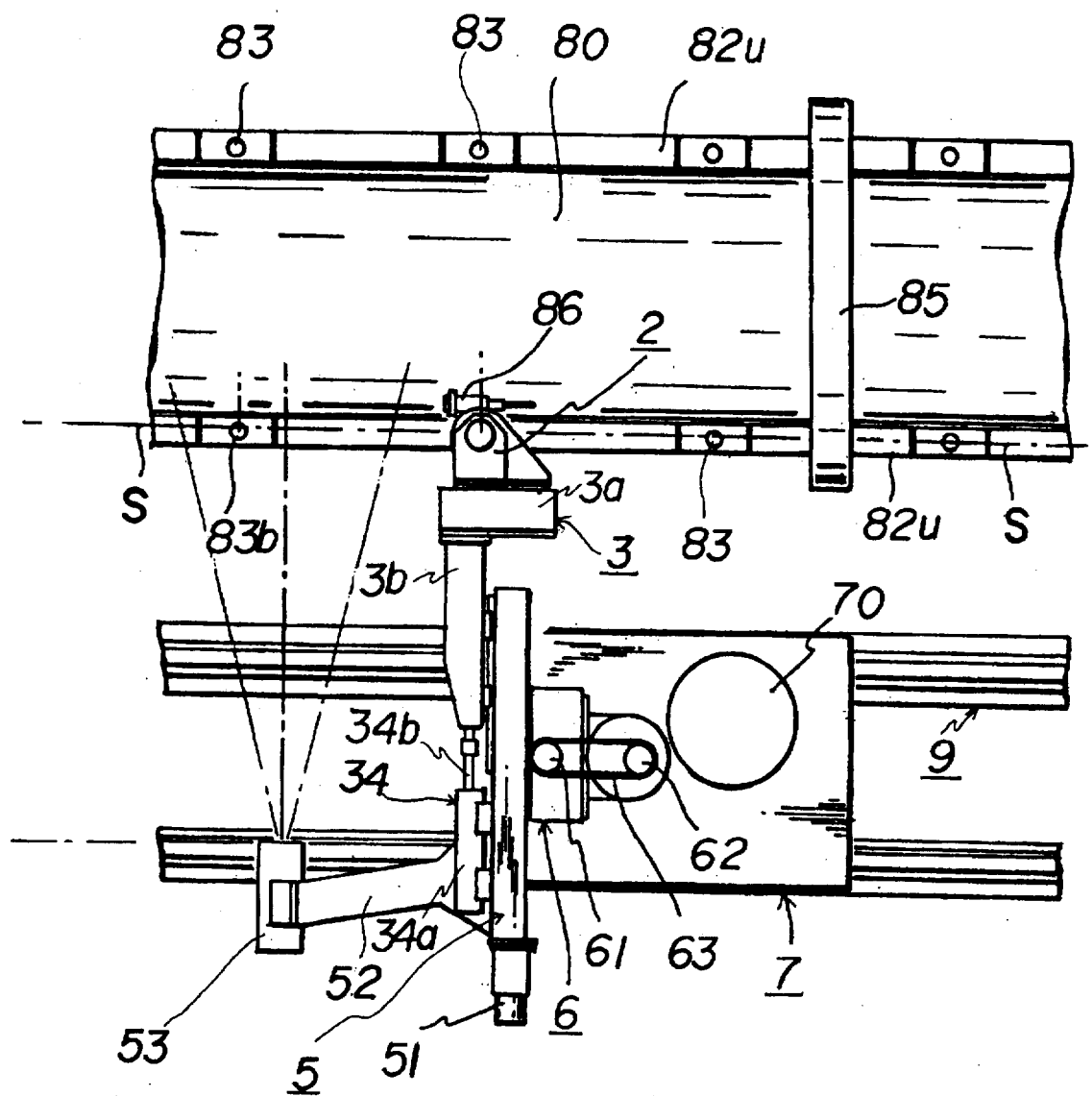
FIG. 2 is a top view of essential parts of the system shown in FIG. 1 including the automatic bolt driving apparatus.
Figure 3:
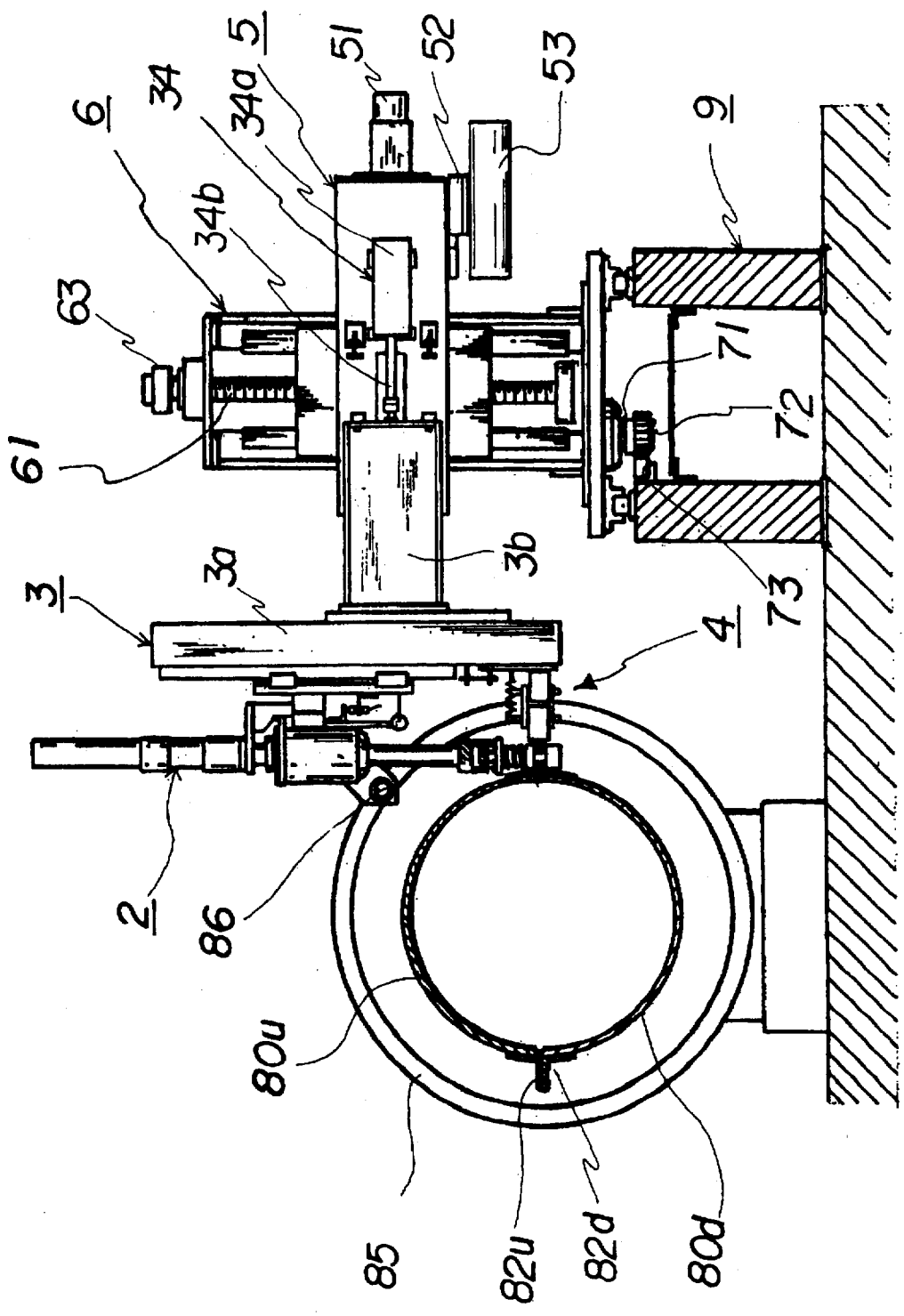
FIG. 3 is an elevational view of the system shown in FIG. 1.
Figure 4:
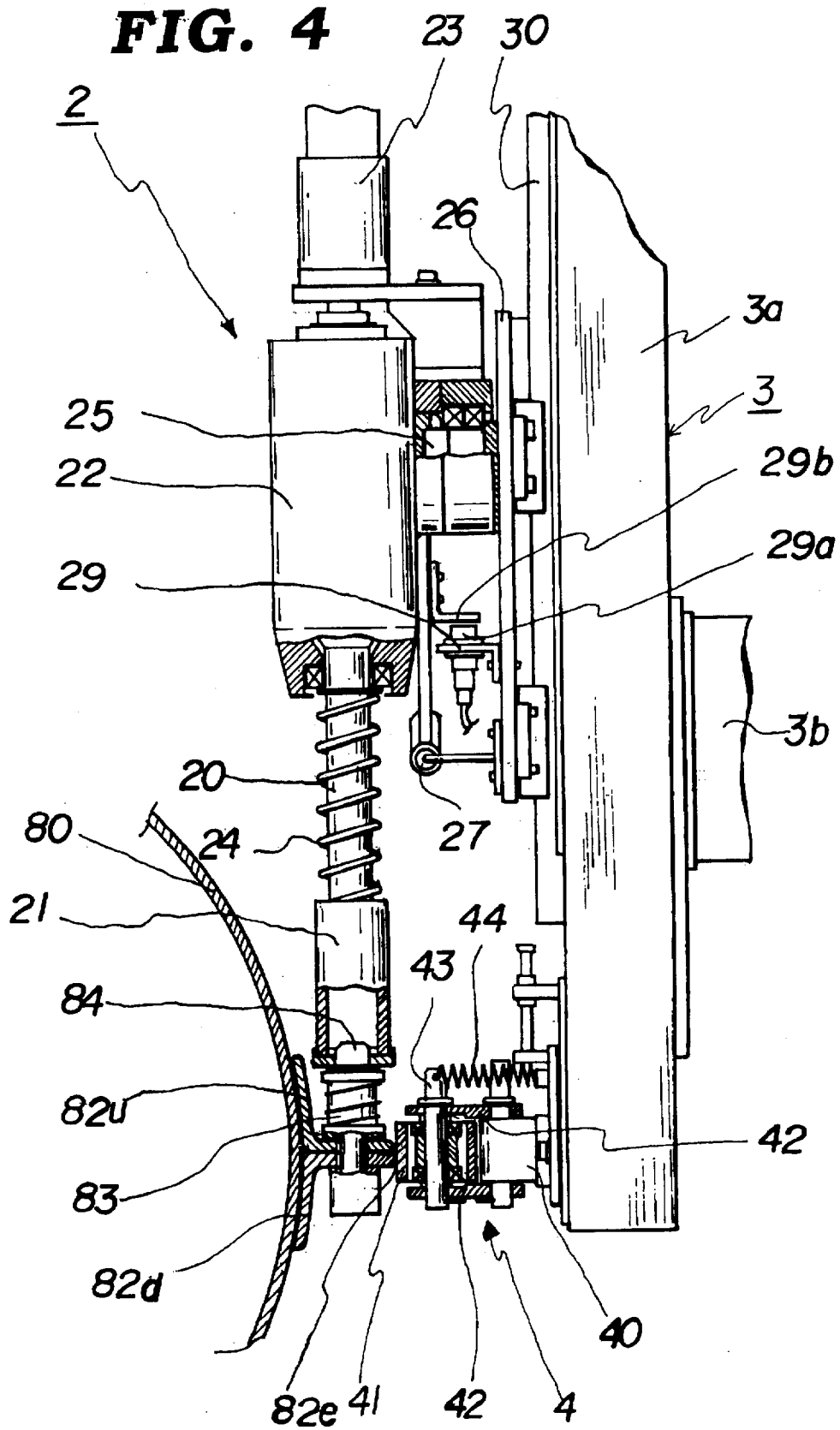
FIG. 4 is an enlarged partially sectional elevational view showing a part of FIG. 3 in detail.

FIG. 2 is a top view of essential parts of the system shown in FIG. 1. FIG. 3 is an elevational view of the system shown in FIG. 1. FIG. 4 is an enlarged partially sectional elevational view showing a part of FIG. 3 in detail.

Now, details of the automatic bolt driving apparatus 100 according to the present invention will be explained in reference to FIGS. 1 to 4.

The automatic bolt driving apparatus 100 mainly consists of a base 7 that is adapted for moving on the track base 9 along the concrete molding frame 80; a vertical supporting unit 6 fixedly mounted on the base 7; a horizontal supporting unit 5 supported by the vertical supporting unit 6 in a manner both vertically and horizontally movable; a driver unit support 3 horizontally slidably mounted on the horizontal supporting unit 5; a bolt driver unit 2 mounted on the driver unit support 3 in a manner vertically movable; an air-cylinder unit 34; a flange follower 4 mounted on the driver unit support 3; and a video camera 53 fixedly mounted on the horizontal supporting unit 5. Each of these main constituent elements will be explained next in detail.

The bolt driver unit 2 is vertically disposed in order to rotate the fastening bolts 83 clockwise or counterclockwise one at a time. The bolt driver unit 2 has a vertical drive shaft 20, a socket 21 fixedly attached to a low end of the drive shaft 20, a cylinder 22, a helical compression spring 24 mounted on the drive shaft 20, and a bidirectional servo-motor 23. The drive shaft 20 is drivably connected to the servo-motor 23 with the cylinder 22 so as to be driven in clockwise or counterclockwise direction. The compression spring 24 is disposed between the socket 21 and the cylinder 22 so that the socket 21 is downwardly urged by the spring 24 against one of the bolts 83 when the socket 21 is engaged with the bolt 83.

The bolt driver unit 2 has a fixing base 26 and rotatable joint 25, and most part of the bolt driver unit 2 is rotatably mounted on the fixing base 26 with the rotatable joint 25. The fixing base 26 is vertically slidably mounted on a vertical guide rail 30 of the driver unit support 3 so as to be vertically (i.e. in "Z" direction) movable along the guide rail 30. The driver unit support 3 has a vertical segment 3a and a horizontal segment 3b fixedly attached to each other. The vertical guide rail 30 is fixedly attached to the vertical segment 3a. The horizontal segment 3b of the driver unit support 3 is horizontally slidably mounted on the horizontal supporting unit 5 as will be described in detail later.

Figure 5:
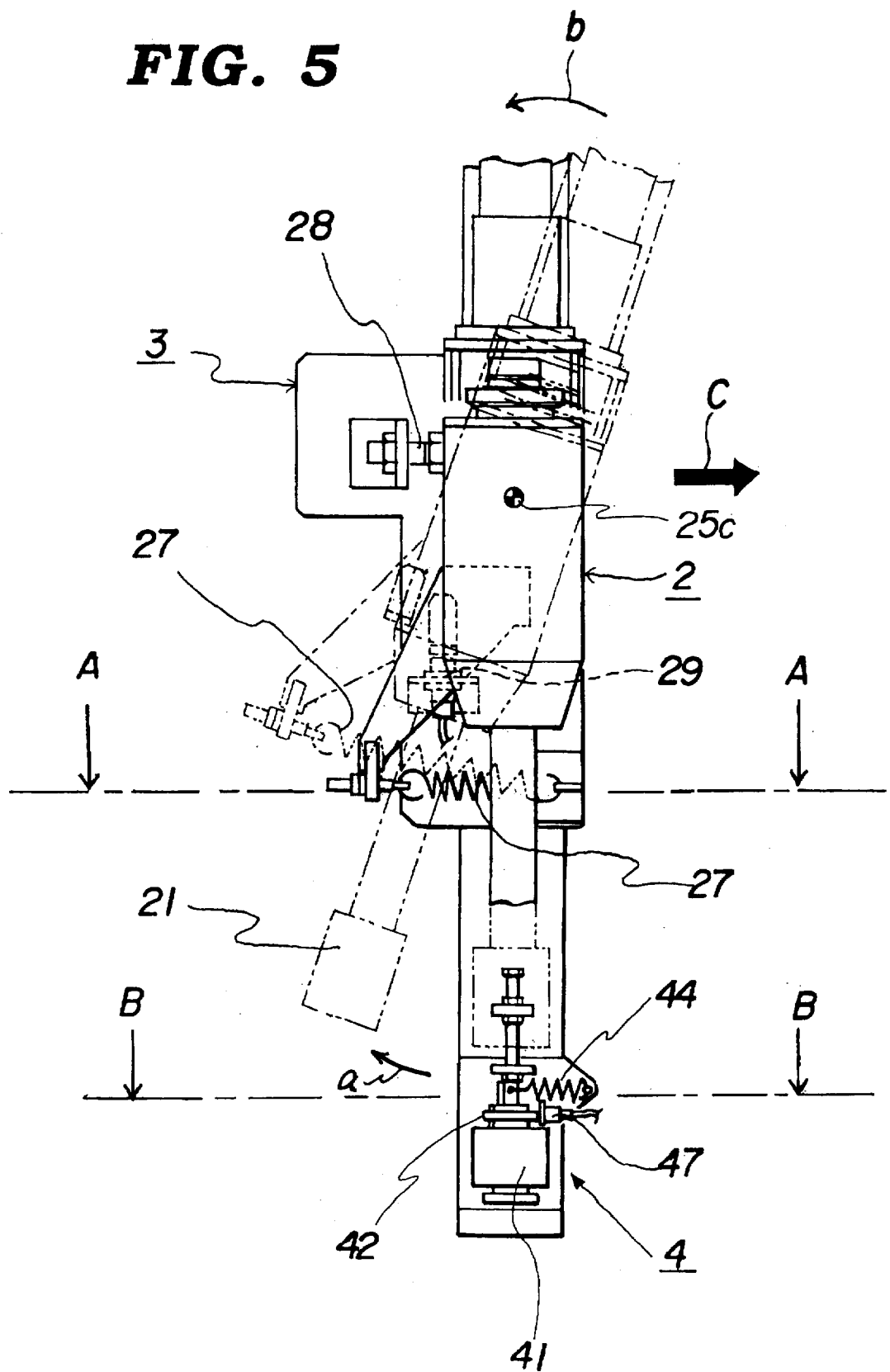
FIG. 5 is an elevational view particularly showing a bolt driver unit and a flange follower used in the automatic bolt driving apparatus shown in FIG. 1.

FIG. 5 shows the bolt driver unit 2 in normal vertical position in solid lines and a tilted position in ghost lines.

Figure 6:
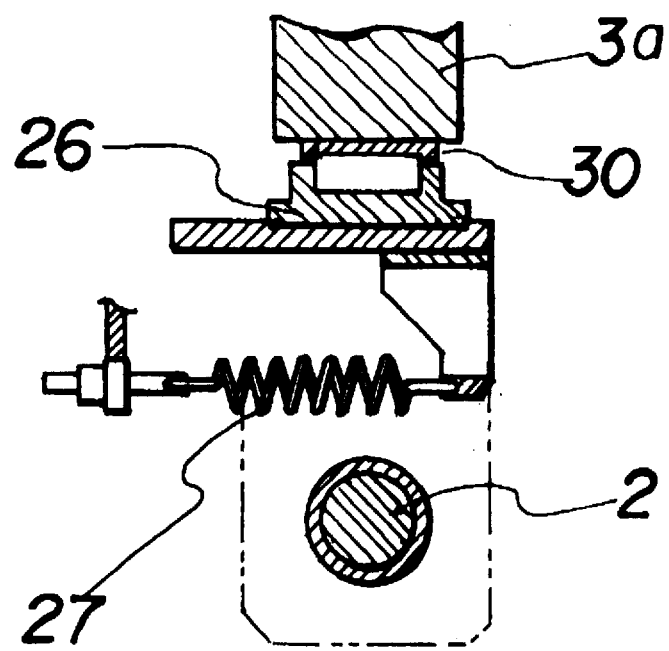
FIG. 6 is a top view taken along line A—A in FIG. 5.

FIG. 6 is a top view taken along line A—A in FIG. 5.

In reference particularly to FIGS. 4, 5 and 6, a tension spring 27 is disposed in a lower space between the rotatable part of the bolt driver unit 2 and the fixing base 26. When the rotatable part of the bolt driver unit 2 is rotated (as shown in ghost lines in FIG. 5) about a horizontal rotational axis 25c of the rotatable joint 25 in the clockwise direction, as indicated by arrow "a" in FIG. 5, from the normal vertical position, the rotatable part of the bolt driver unit 2 is urged by the spring 27 in the opposite rotational direction.

A stopper 28 (FIG. 5) is fixedly attached to the driver unit support 3 so that the rotatable part of the bolt driver unit 2 does not rotate in the counterclockwise direction, as indicated by arrow "b" in FIG. 5, beyond the normal vertical position. A sensor switch unit 29, which consists of a sensor 29a and a sensor plate 29b, is disposed between the rotatable part of the bolt driver unit 2 and the fixing base 26 in a manner that the sensor 29a is fixed to the fixing base 26 and the sensor plate 29b is fixed to the rotatable part of the bolt driver unit 2, so that any rotational movement of the rotatable part of the bolt driver unit 2 is detected by the sensor unit 29.

The moving direction, from one bolt location to the next bolt location, of the bolt driver unit 2 (or, the entire automatic bolt driving apparatus 100) is indicated by bold arrow "C" in FIG. 5. When the socket 21, or any other part of the bolt driver unit 2, accidentally collides with any object, such as a tire 85 (FIGS. 2 and 3) on the molding frame 80, the rotatable part of the bolt driver unit 2 makes a rotational movement about the axis 25c (FIG. 5) against the tension of the spring 27. Thus, a possible physical damage to the bolt driver unit 2 can be avoided.

An ultrasonic sensor 86 (FIGS. 2 and 3) is fixedly attached to the bolt driver unit 2 so that the sensor 86 detects the tire 85 when the bolt driver unit 2 comes close to the tire 85.

The vertical segment 3a of the driver unit support 3 has an approximately rectangular shape and has the vertical guide rail 30 (FIG. 4) fixedly attached thereto, and the horizontal segment 3b is fixedly attached thereto on the side opposite to the side of the bolt driver unit 2.

Figure 7:
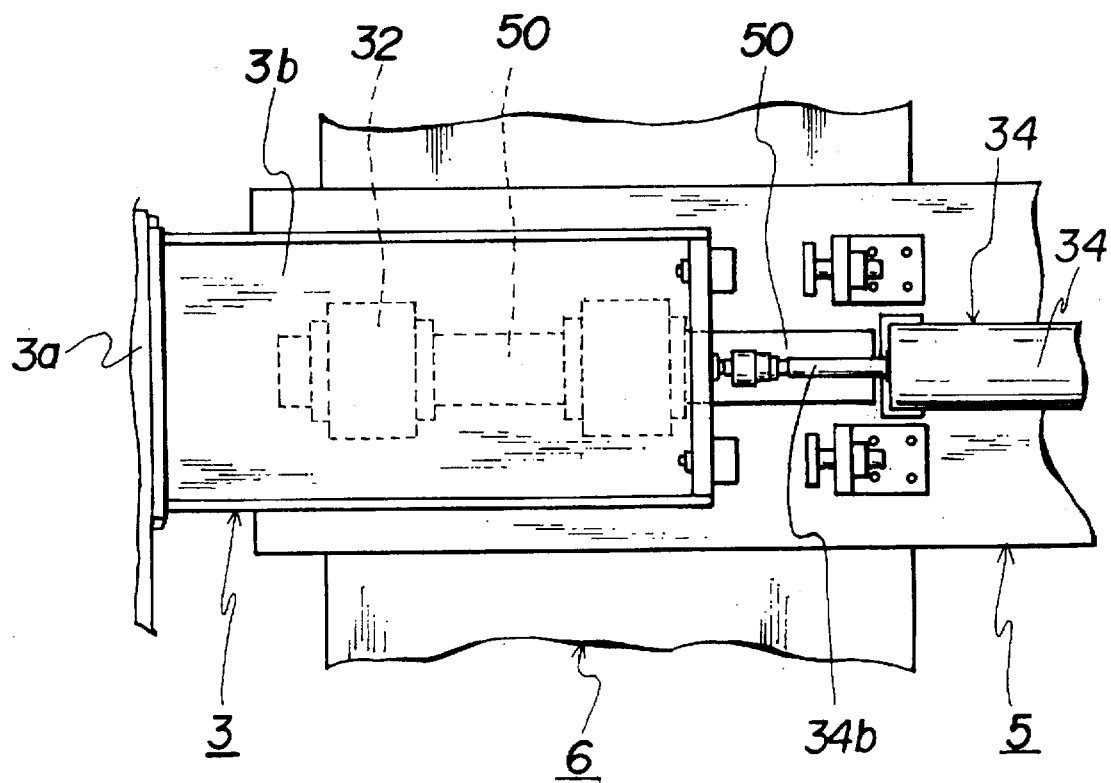
FIG. 7 is a side view of a part of the automatic bolt driving apparatus shown in FIG. 1.
Figure 8:
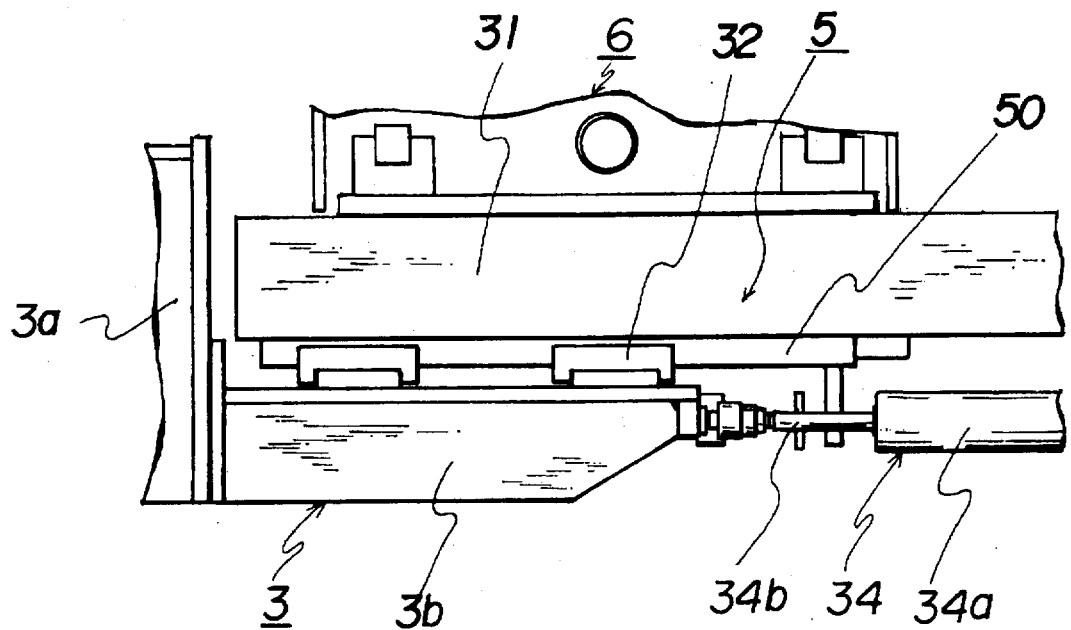
FIG. 8 is a top view of a part of the automatic bolt driving apparatus shown in FIG. 1.

FIG. 7 and FIG. 8 are a side view and a top view, respectively, particularly showing the part for connection between the driver unit support 3 and the horizontal supporting unit 5.

Referring to FIGS. 7 and 8, the horizontal segment 3b of the driver unit support 3 has a pair of slide bases 32 fixedly attached thereto on the rear side (as viewed in FIG. 7) thereof. The slide bases 32 are slidably mounted on a horizontal slide guide 50 fixedly attached to a vertical side wall of the horizontal supporting unit 5 so that the driver unit support 3 together with the bolt driver unit 2 are horizontally movable in "Y" direction.

The air-cylinder unit 34 has an air-cylinder 34a, which is fixedly mounted on the horizontal supporting unit 5, and an actuating rod 34b. One end of the rod 34b is linked to the horizontal segment 3b of the driver unit support 3.

The rod 33 is actuated by the air cylinder 34 for the purpose of fine positional adjustment of the bolt driver unit 2 in "Y" direction in order to align the socket 21 of the driver 2 with the bolt 83, as will be mentioned in detail later, and to maintain a proper urging force of a guide roller 41 (FIGS. 4 and 5) of the flange follower 4 against the flanges 82d, 82u.

The fastening bolts 83 will not necessarily be precisely aligned with a locus "S" (FIG. 2) of the rotational center of the socket 21 being moved along the molding frame 80, but each of the bolts 83 may actually be slightly deviated in "Y" direction from an ideal position.

Figure 9:
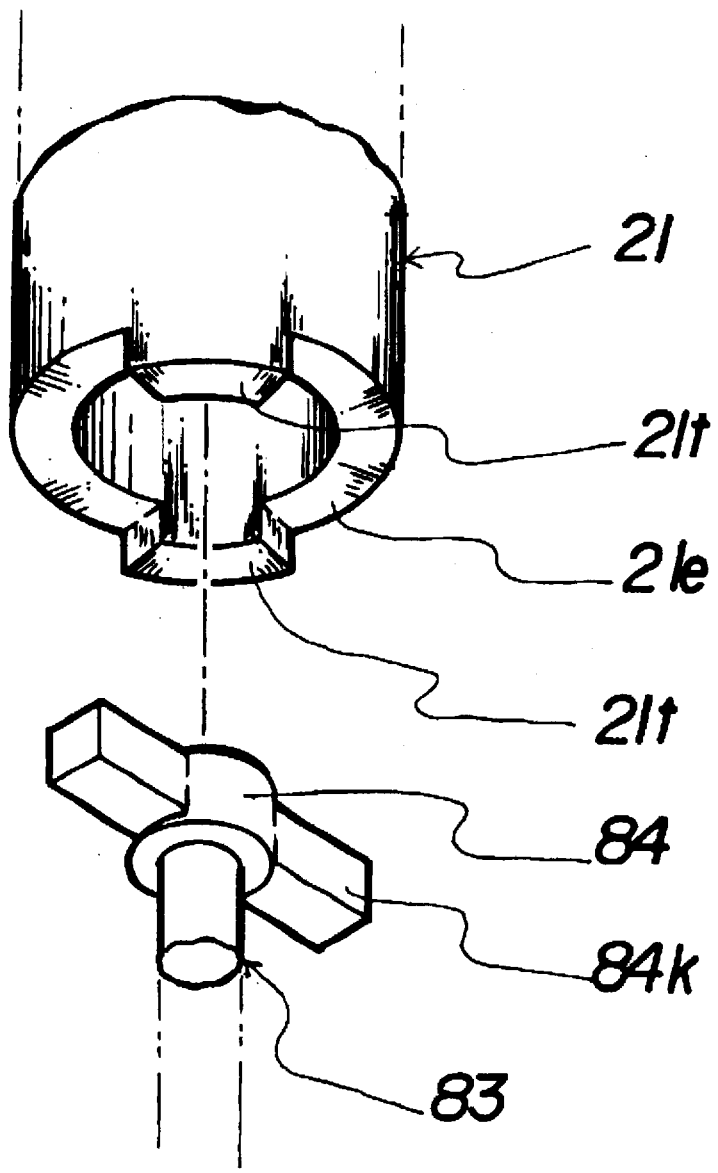
FIG. 9 perspectively shows low end part of a socket used in the automatic bolt driving apparatus shown in FIG. 1 and a top part of a bolt that is driven by the apparatus.
Figure 10A:
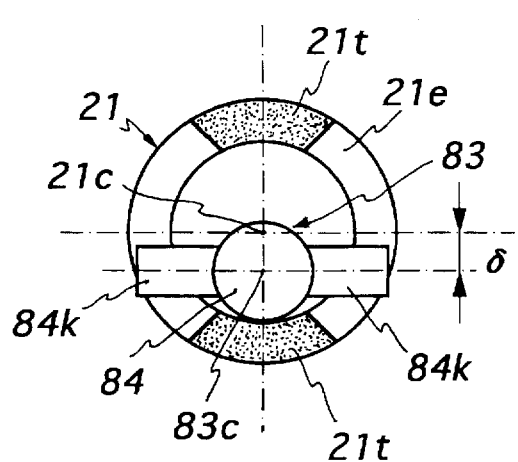
FIGS. 10A and 10B are diagrammatic under views particularly showing horizontal relative positions of the socket and the bolt that are partially shown in FIG. 9.
Figure 10B:
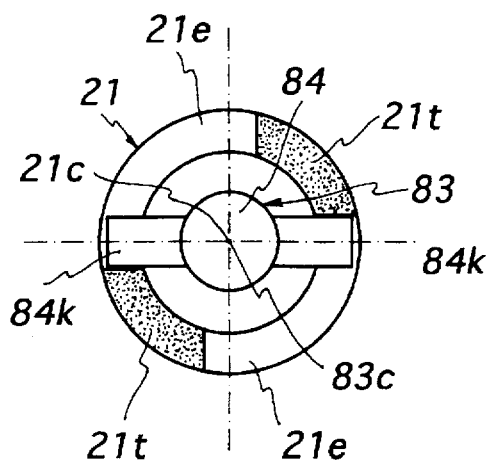

FIG. 9 perspectively shows a low end part of the socket 21 and a top part of one of the bolts 83. FIGS. 10A and 10B are diagrammatic under views particularly showing horizontal relative positions of the socket 21 and the bolt 83. As shown in FIGS. 9, 10A, and 10B, the socket 21 has a pair of diametrically opposing engaging jaws 21t downwardly projecting from a low end 21e thereof and the bolt 83 has a bolthead 84 from which a pair of wings 84k diametrically outwardly extend. The inside diameter of the socket 21 is substantially larger than the diameter of the bolthead 84 so that even if the center 83c of the bolt 83 is deviated from the center 21c of the socket 21, within a maximum allowable deviation amount indicated by "δ" in FIG. 10A, the socket 21 can still catch the bolthead 84 to make a so-called "flexible coupling" with the bolt 83.

Figure 11:
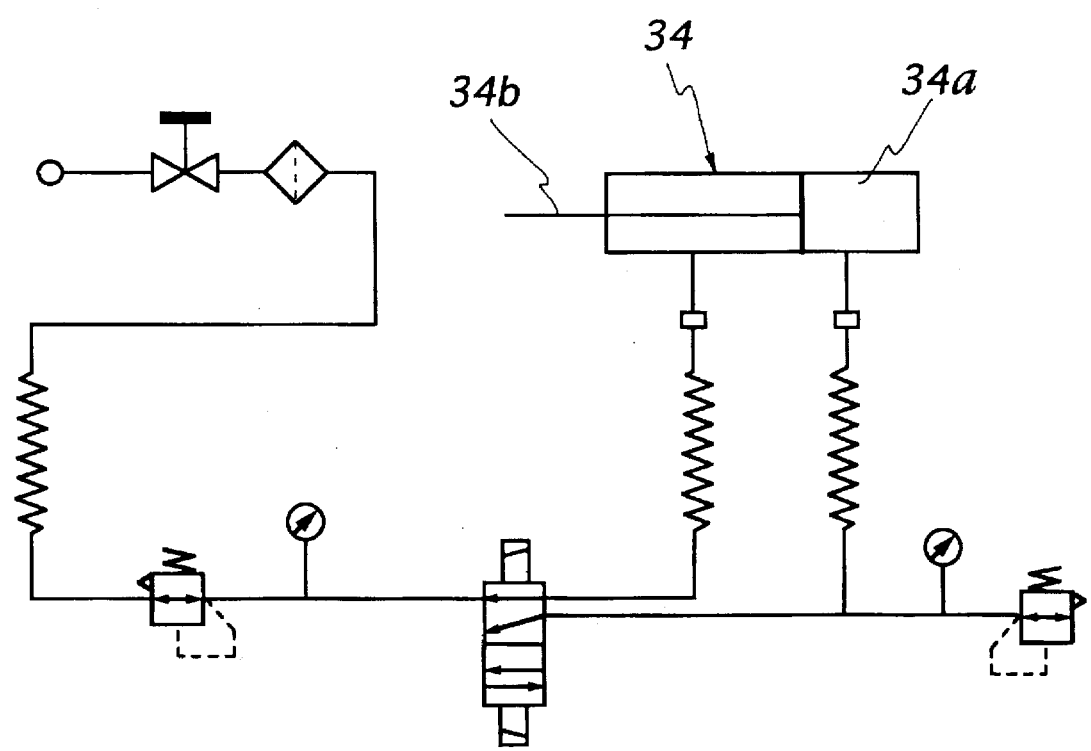
FIG. 11 is a circuit diagram of a air pressure control system used for the automatic bolt driving apparatus shown in FIG. 1.

When the socket 21 is rotated under the condition that the socket 21 is engaged but not concentrically aligned with the bolt 83 in "Y" direction, a force will be exerted on the bolt driver unit 2 so as to move the bolt driver unit 2 in "Y" direction while the socket is rotating because the bolt driver unit 2 is allowed to horizontally move in "Y" direction together with the driver unit support 3 and the rod 34b within the horizontally shiftable range of the rod 34b. Then, the movement of the rod 34b causes the air pressure in the air cylinder 34a to change. The variation of the air pressure in the air cylinder 34a will be sensed by the air pressure control system shown in FIG. 11. Then, responsive to the variation of the air pressure in the air cylinder 34a, the air pressure control system functions to keep the air pressure in the cylinder 34a at a predetermined pressure, thereby causing to actuate the rod 34b to shift the bolt driver unit 2 in "Y" direction to a proper position where the socket 21 is concentrically better aligned with the bolt 83.

Next, explanation will be made on the flange follower 4 in reference to FIGS. 1, 4, 5 and 12. The flange follower 4 is mounted on a low end section of the vertical segment 3a of the driver unit support 3 at the level of the flanges 82d, 82u and opposing thereto. The flange follower 4 has a flange follower base 40 securely attached to the vertical segment 3a on the side opposing the flanges 82d, 82u, a roller holder 42 pivotably connected to the flange follower base 40 so that the roller holder 42 horizontally pivots about a vertical rotational axis 42c thereof, and a cylindrical guide roller 41, having a vertical rotational axis 43c, rotatably mounted on the roller holder 42 with a vertical roller shaft 43.

Figure 12:
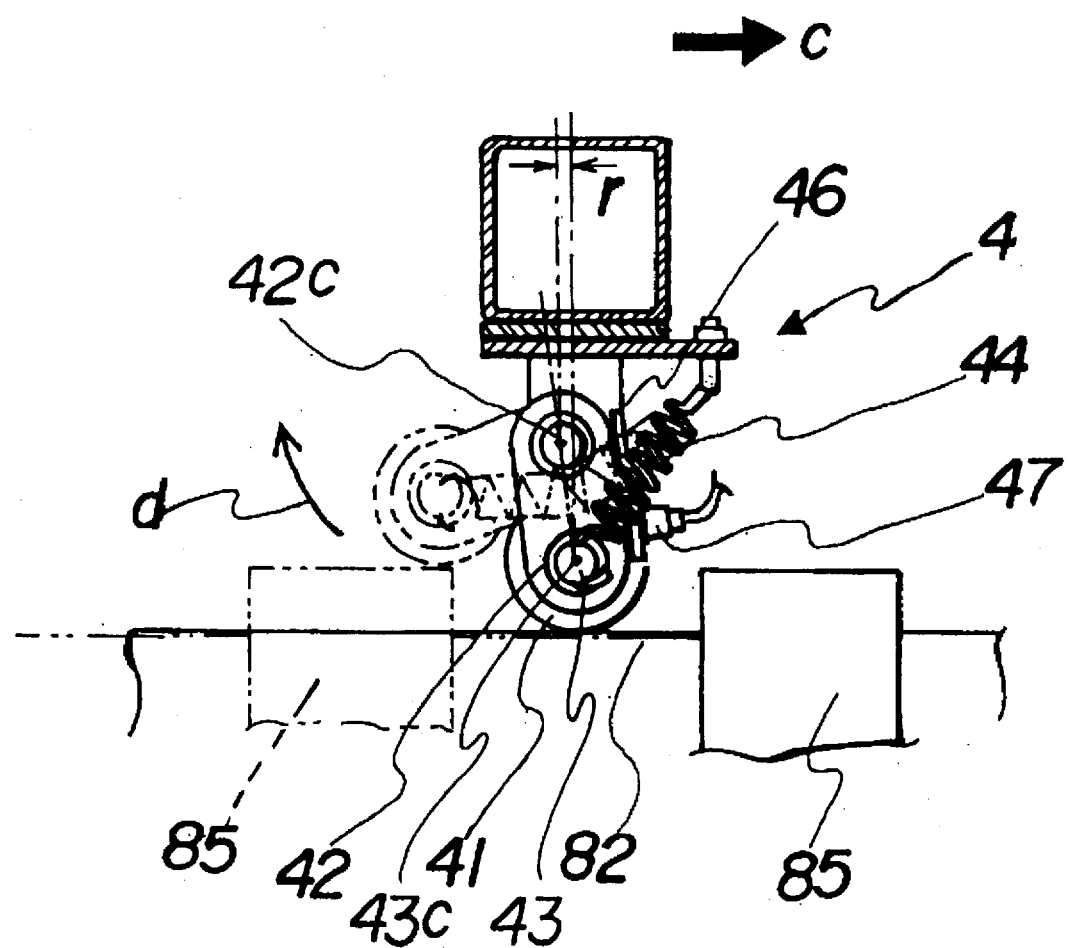
FIG. 12 is a top view taken along line B—B in FIG. 5.

A tension spring 44 is horizontally disposed between a top section of the roller shaft 43 and the flange follower base 40 in a manner that the guide roller 41 is always pulled by the spring 44 in the moving direction, as indicated by bold arrow "C" in FIGS. 5 and 12, of the bolt driver unit 2.

In reference to FIG. 12, the center axis 43c of the shaft 43 is slightly offset (by amount "γ") toward the moving direction (arrow "C") of the bolt driving apparatus 100 from a vertical plane including the rotational axis 42c of the roller holder 42 that is orthogonal to the edges 82e of the flanges 82d, 82u, or the moving direction of the bolt driving apparatus 100, or the direction "X". A stopper 46 and a sensor switch 47 are mounted on the flange follower base 40 on the side of the moving direction of the bolt driver unit 2. The stopper 46 limits the rotation of the roller holder 42 in the moving direction of the bolt driving apparatus 100.

The flange follower 4 moves along the flanges 82d, 82u while the guide roller 41 maintains contact with the flange edges 82e so that the position of the bolt driver unit 2 in "Y" direction can be maintained with respect to the position of the flanges 82d, 82u.

Referring to FIG. 12, if and when the guide roller 41 accidentally collides against the tire 85 or any other object, the roller holder 42 will rotate in the direction indicated by arrow "d" about the rotational axis 42c thereof against the pulling force of the tension spring 44 and the guide roller 41 will roll over the tire 85, or other object, as shown in ghost lines, so that the flange follower 4 will be prevented from being damaged. The sensor switch 47 detects a state when the roller holder 42 rotates in the direction indicated by arrow "d". The guide roller 41 will revert to the normal position to maintain contact with the flanges 82d, 82u as soon as the guide roller 41 has cleared the tire or other object. The guide roller 41 may be replaced with a non-rotating slider member as an alternative embodiment.

In reference to FIGS. 1, 2, 3 and 8, the horizontal supporting unit 5, which is generally formed in a rectangular tube, has a slide guide 50 horizontally extending in "Y" direction and fixedly attached thereto. The horizontal segment 3b of the driver unit support 3 is slidably mounted on the slide guide 50 with the slide bases 32 so that the driver unit support 3 can be horizontally moved in "Y" direction along the slide guide 50 within the shiftable range of the rod 34b. Such movement of the driver unit support 3 is translated to a movement of the bolt driver unit 2 in "Y" direction.

The horizontal supporting unit 5 is supported by the vertical supporting unit 6 in a manner movable both vertically and horizontally. The horizontal movement of the horizontal supporting unit 5 is performed by a servo-motor 51 mounted on an end of the horizontal supporting unit 5, and the vertical movement thereof is performed by a rotation of a ball-screw 61 that is driven by a gear motor 62 with a timing belt 63 and a pair of timing pulleys 64.

The vertical supporting unit 6 is fixedly mounted on the table-like base 7. The base 7 not only functions as the basic supporting member for the bolt driver unit 2, the driver unit support 3, the flange follower 4, the horizontal supporting unit 5, and the vertical supporting unit 6 but also causes the entire automatic bolt driving apparatus 100 to move on the track base 9 horizontally along the molding frame 80 in "X" direction.

The drive mechanism for moving the entire bolt driving apparatus 100 on the track base 9 includes a servo-motor 70 (FIG. 1) mounted on the base 7, having a drive shaft 71 (FIG. 3) downwardly projecting under the base 7, a pinion gear 72 mounted on the shaft 71, and a rack gear 73 that is engaged with the pinion gear 72 and fixedly attached to the track base 9.

Referring to FIGS. 1, 2 and 3, a CCD monitor video camera 53 is mounted on the horizontal support 5 with a mounting bracket 52 in a manner that the mounting bracket extends in "X" direction and the camera 53 is focussed on a view area including the next bolt 83b (FIG. 2) that is to be driven by the bolt driver unit 2 succeeding to the bolt 83 that is currently driven for the purpose of measuring the position of the bolt 83b.

It will be understood that various changes and modifications may be made in the above described embodiments which provide the characteristics of the present invention without departing from the spirit and principle thereof particularly as defined in the following claims.

What is claimed is:

1. An automatic bolt driving apparatus movable in a direction for driving a plurality of bolts positioned substantially in line on flanges of elongated concrete molding frame segments to secure the frame segments for producing columnar concrete products, comprising:
   (a) a base that is adapted for moving along the elongated concrete molding frame segments;
   (b) a vertical supporting unit fixedly mounted on said base;
   (c) a horizontal supporting unit that is supported by said vertical supporting unit in a manner vertically and horizontally movable;
   (d) a driver unit support horizontally slidably mounted on said horizontal supporting unit;
   (e) a bolt driver unit mounted on said driver unit support in a manner vertically movable, said bolt driver unit having a drive shaft and a socket attached to a low end of said drive shaft;
   (f) an air-cylinder unit having an air-cylinder, which is fixedly mounted on said horizontal supporting unit, and an actuating rod that is linked to said driver unit support so that when said bolt driver unit drives one of the bolts in a state that said socket of said bolt driver unit and the bolt are non-concentrically engaged with each other air pressure inside said air-cylinder varies, thereby causing to actuate said rod to move said driver unit support so as to properly reposition said bolt driver unit;
   (g) a flange follower mounted on said driver unit support for guiding said bolt driver unit; and
   (h) a video camera fixedly connected to said horizontal supporting unit, said video camera being adapted for being focused on at least one of the bolts on the flanges.

2. An automatic bolt driving apparatus according to claim 1, wherein at least a part of said flange follower is pivotable about a vertical first rotational axis in one rotational direction while being urged by a spring in the other rotational direction, so that any impact to said pivotable part of said flange follower can be mitigated when said part accidentally collides with an object while the automatic bolt driving apparatus is in motion.

3. An automatic bolt driving apparatus according to claim 2, wherein said flange follower has a roller, with a vertical second rotational axis, for keeping contact with the flanges and said second rotational axis is offset toward the moving direction of the automatic bolt driving apparatus with respect to said first rotational axis.

4. An automatic bolt driving apparatus according to claim 2, wherein said automatic bolt driving apparatus further has a sensor that detects a pivoted state of said pivotable part of said flange follower.

5. An automatic bolt driving apparatus according to claim 1, wherein at least a part of said bolt driver unit is normally disposed vertically, but is pivotable in one rotational direction with a horizontal pivotal axis orthogonal to the moving direction of the automatic bolt driving apparatus while being urged by a spring in the other rotational direction, so that any impact to said pivotable part of said bolt driver unit can be mitigated when said part accidentally collides with an object while the automatic bolt driving apparatus is in motion.

6. An automatic bolt driving apparatus according to claim 5, wherein the automatic bolt driving apparatus further has a sensor unit that detects a tilted state of said pivotable part of said bolt driver unit.

* * * * *